D. C. KITCHING.
LAMP ADJUSTING MECHANISM.
APPLICATION FILED DEC. 15, 1913.
1,129,207.
Patented Feb. 23, 1915.
2 SHEETS—SHEET 1.
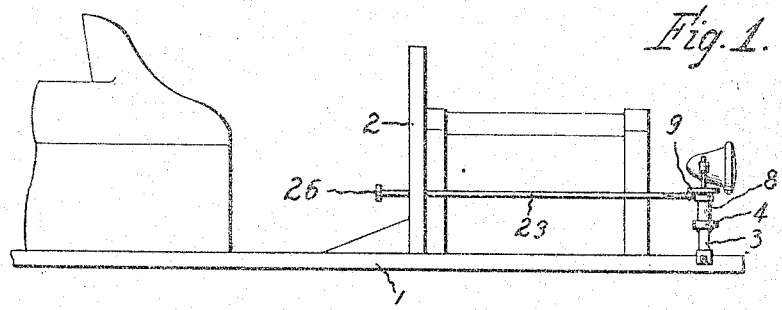
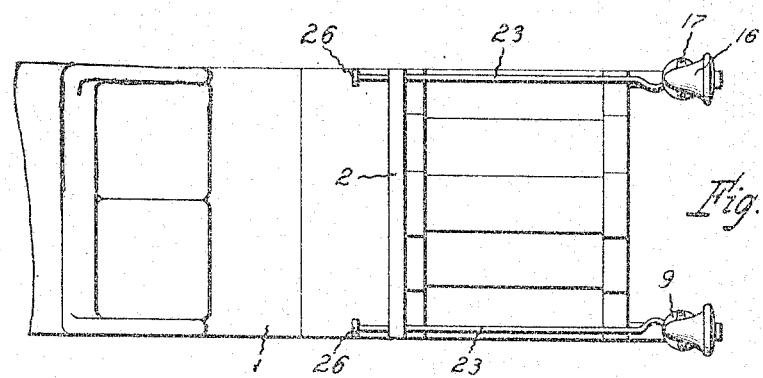
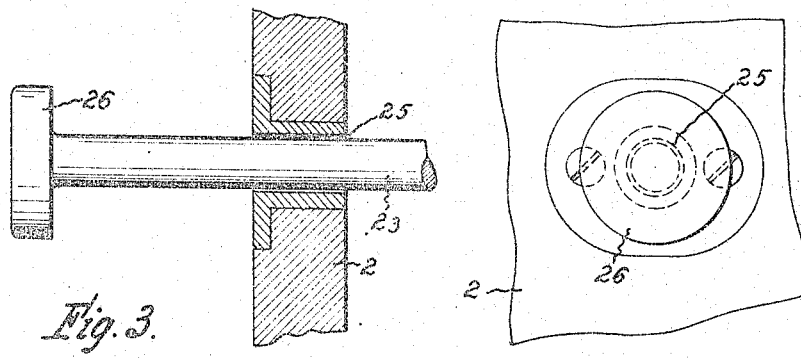
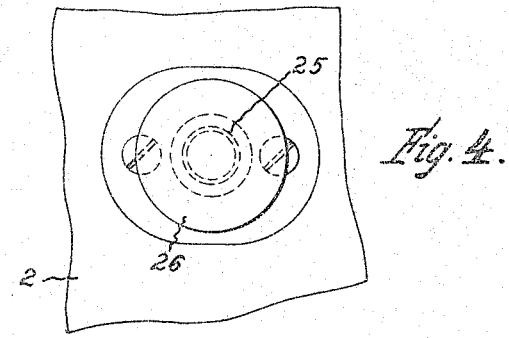
WITNESSES:
INVENTOR
D. C. Kitching
BY John M. Spellman
ATTORNEY D. C. KITCHING.
LAMP ADJUSTING MECHANISM.
APPLICATION FILED DEC. 15, 1913.
1,129,207.
Patented Feb. 23, 1915.
2 SHEETS—SHEET 2.
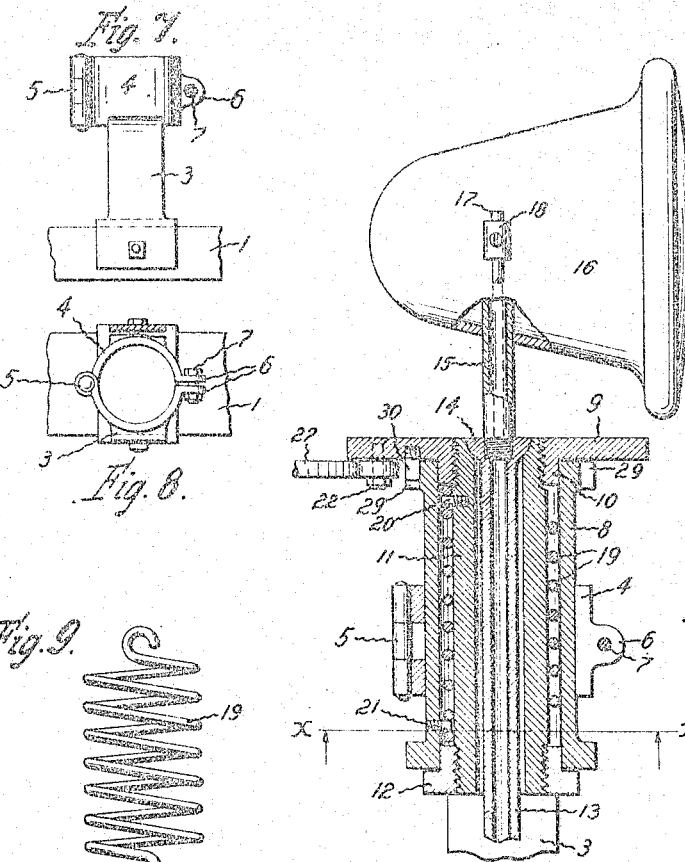
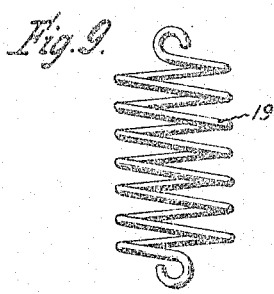
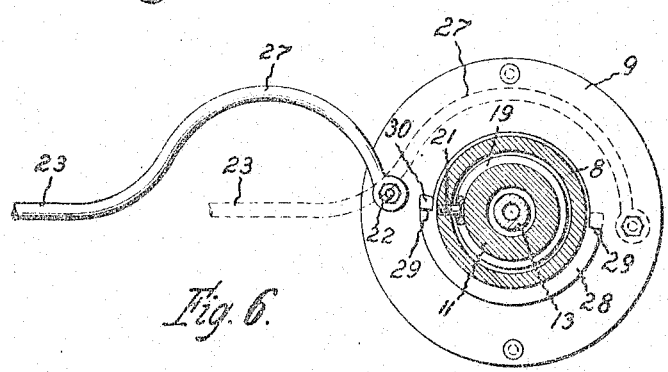
WITNESSES:
INVENTOR
D. C. Kitching
John W. Spellman
ATTORNEY

UNITED STATES PATENT OFFICE.

DAVID C. KITCHING, OF VALLEY MILLS, TEXAS.

LAMP-ADJUSTING MECHANISM.

1,129,207.

Specification of Letters Patent.

Patented Feb. 23, 1915.

Application filed December 15, 1913. Serial No. 306,687.

*To all whom it may concern:*

Be it known that I, DAVID C. KITCHING, a citizen of the United States, residing at Valley Mills, in the county of Bosque and State of Texas, have invented certain new and useful Improvements in Lamp-Adjusting Mechanisms, of which the following is a specification.

My invention relates to a new and improved mechanism for angularly adjusting the lamps of an automobile or other vehicle, and it is the object of the invention to provide a mechanism of the character described that may be readily operated from the driver's seat, and will serve to direct the light from the lamps in any direction within a certain arc, so that the light may be caused to follow the curve of a road, or to illuminate any object at the side of the road or street as desired.

A further object of my invention is to provide a device of the character described that will be strong, durable, simple and efficient and comparatively easy to construct, and also one that will not be likely to get out of working order.

With these and various other objects in view, my invention has relation to certain novel features of the construction and operation, an example of which is described in the following specification, and is illustrated in the accompanying drawings, wherein:

Figure 1 is a view showing in side elevation the body portion of an automobile equipped with my improved lamp adjusting device. Fig. 2 is a top view of the same. Fig. 3 is a detail sectional view of a push rod by which my adjusting device is actuated. Fig. 4 is a front view of said push rod. Fig. 5 is a detail vertical axial sectional view showing the swivel mounting of the lamps which my invention is designed to adjust. Fig. 6 is a detail horizontal sectional view of the same, the section being taken upon the line $x$—$x$ of Fig. 5. Fig. 7 is a detail view in side elevation of a bracket, one of which is employed in my invention to support each of the automobile lamps. Fig. 8 is a top view of the same. Fig. 9 is a detail view of a spring, forming part of the mechanism illustrated in Fig. 5.

Referring now more particularly to the drawings, wherein like reference characters designate similar parts in all the figures, the numerals 1 and 2 respectively denote the chassis and dashboard of an automobile. Upon the forward extremity of the chassis, at each side thereof, there is mounted fast an upstanding bracket 3 rigidly surmounted by a horizontal two part ring 4, one member of said ring being integral with the bracket 3 and the other being hinged to the bracket as indicated at 5. Opposite to said hinge, each half of each ring is formed with a lug 6 serving to receive a bolt 7 by which the two halves of the ring may be clamped around a vertical cylindrical member 8. Upon each member 8, there is swively surmounted a circular plate 9, centrally apertured and formed upon its underside with a circular flange 10 extending into the member 8 and inclosing the central aperture of said plate. The central aperture of the plate 9 receives the upper extremity of a tubular member 11 having a screw threaded connection with said plate. The member 11 occupies a spaced relation to the member 8, and has threaded upon its lower extremity a collar 12, a portion of which projects into the lower end of the member 8. The parts 9, 10, 11 and 12 are adapted to rotate as a unit within the member 8. Through the lower extremity of the tube 11, there is extended into said tube a pipe or flexible tube 13, terminating flush at its upper extremity with the top surface of the plate 9, said upper extremity being somewhat enlarged as indicated at 14. Into the portion 14 of the tube 13, there is threaded the lower end of a short piece of tubing 15 extending upwardly into an automobile lamp 16, and serving in conjunction with the tube 13 to conduct a gaseous fuel to the burner of said lamp. The lamp 16 is supported at a certain elevation above the plate 9 in a rigid relation to said plate by a pair of vertical rods 17, rigidly connected at their lower extremities with the plate 9, and rigidly engaged at their upper ends by a pair of lugs 18 respectively formed upon the lamp 16 at opposite sides thereof.

In the space intervening between the members 8 and 11 there is mounted a coiled spring 19, having one of its extremities rigidly engaging a pin 20 mounted in the member 11 adjacent to the upper end thereof. The lower end of said spring is rigidly engaged with a pin 21 mounted fast in the member 8 adjacent to the lower extremity of said member. The spring 19 normally holds the correlated lamp 16 in a position such that its rays are directed forwardly and after the lamp has been adjusted to direct the rays to one side, said spring will serve to return the lamp to its normal position.

To the rear of the lamp 16, there is pivotally connected to the plate 9 at a point 22, the forward extremity of a rod 23, which rod adjacent to its rear end is extended through an aperture 25 in the dashboard, and is provided upon its rear extremity with a button 26. By exerting a forwardly acting pressure upon the button 26, the correlated rod 23 will be subjected to a forward displacement, and the correlated lamp 16 will be subjected to a partial rotation through an angular distance not greater than one hundred and eighty degrees. In its position of maximum angular adjustment, the lamp 16 will be embraced by a goose-necked portion 27 of the rod 23, as is indicated in dash lines in Fig. 6.

At its upper extremity, the member 8 is formed with a semi-annular flange 28, terminating at substantially diametrically opposite points in shoulders 29. In the plate 9, there is mounted fast a pin 30 which depends closely adjacent to the upper end of the member 8, and through its contact with the shoulders 29 limits the angular displacement to which the member 9 and consequently the lamp 16 may be subjected. The two limiting positions of the lamps 16 which positions are determined by the shoulders 29 are such that the lamps respectively direct their rays in substantially forward and rearward directions in the two positions.

As long as pressure is maintained upon the button 26, the correlated lamp 16 will remain displaced from its normal position, the extent of the angular displacement being directly proportioned to the extent of the forward displacement communicated to the rod 23.

While the primary application of my invention will lie in its adaptation to an automobile, it is to be understood that the mechanism constituting my invention may be also correlated with the headlight of a locomotive or with the light of any vehicle.

By utilizing my invention to accomplish the illumination of curves about to be traversed by an automobile, the danger of automobiling will be materially decreased.

The invention is presented as including all such modifications and changes as properly come within the scope of the following claims:

What I claim is:

1. In a headlight adjusting device, a rotatively fixed vertical cylindrical member, a tubular member rotatable within the cylindrical member, closures at each end of the cylindrical member to which the tubular member is attached, a coiled spring surrounding the tubular member between the closures and within the cylindrical member having one end fixed to one member and the other end connected to the other member, a headlight support mounted on one of the closures and means connected to one of the closures for rotating the tubular member.

2. In a headlight adjusting device, a rotatively fixed vertical cylindrical member, a tubular member rotatable within the cylindrical member, closures at each end of the cylindrical member to which the tubular member is attached, a coiled spring surrounding the tubular member between the closures and within the cylindrical member, having one end fixed to one member and the other end connected to the other member, a headlight support mounted in one of the closures, an actuating rod pivoted to one of the closures an arranged to impart rotation to the tubular member, and a stop carried by one of the members and arranged to limit the rotation of the tubular member in two directions.

In testimony whereof I have signed my name to this specification in the presence of two subscribing witnesses.

DAVID C. KITCHING.

Witnesses:
W. C. DOWNING,
JACK A. SCHLEY.